No. 643,475. Patented Feb. 13, 1900.
W. A. CROTTS.
WAGON BOX HOLDER.
(Application filed Oct. 31, 1899.)
(No Model.)
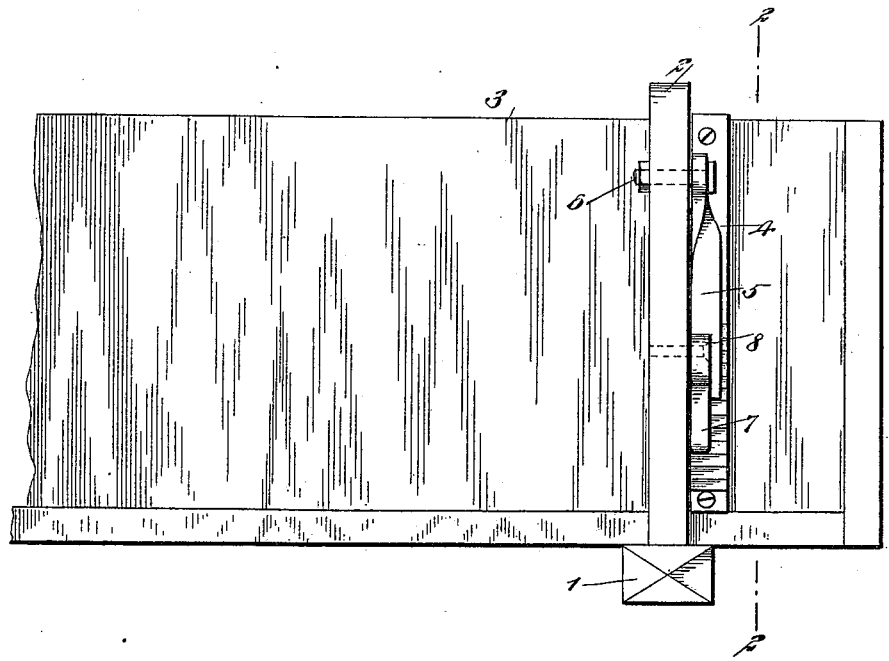
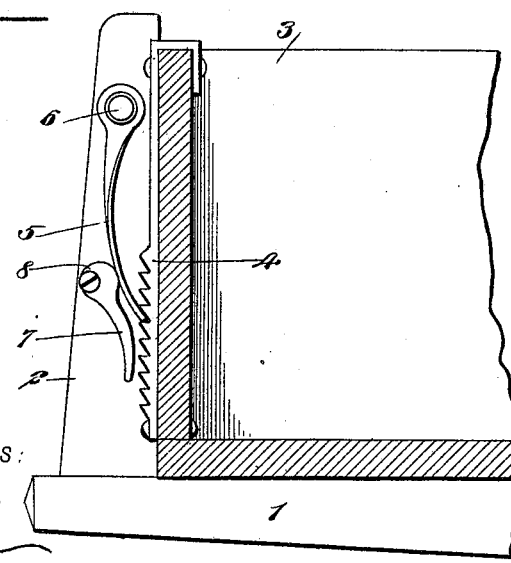
WITNESSES:
INVENTOR
ATTORNEYS.

UNITED STATES PATENT OFFICE.

WILLIAM A. CROTTS, OF PARTRIDGE, KANSAS.

WAGON-BOX HOLDER.

SPECIFICATION forming part of Letters Patent No. 643,475, dated February 13, 1900.

Application filed October 31, 1899. Serial No. 735,400. (No model.)

*To all whom it may concern:*

Be it known that I, WILLIAM A. CROTTS, a citizen of the United States, and a resident of Partridge, in the county of Reno and State of Kansas, have invented a new and Improved Wagon-Box Holder, of which the following is a full, clear, and exact description.

This invention relates to improvements in devices for holding a wagon-box firmly in connection with a bolster; and the object is to provide a simple device to prevent the jumping motion of a wagon body or box on the rear bolster, as often happens when an empty wagon-box is loosely placed on the bolster and when driving over rough places or when the horses are on a trot, thus not only making a disagreeable rattling, but causing the parts to wear out quickly.

I will describe a wagon-box holder embodying my invention and then point out the novel features in the appended claims.

Reference is to be had to the accompanying drawings, forming a part of this specification, in which similar characters of reference indicate corresponding parts in both figures.

Figure 1 is a side elevation of a portion of a wagon-box, showing a holder embodying my invention; and Fig. 2 is a section through the line 2 2 of Fig. 1.

Referring to the drawings, 1 designates a bolster, 2 a standard, and 3 the wagon-box. Attached to the side-board of the box is a rack-bar 4, with either one of the teeth of which the free end of a dog 5 is adapted to engage. This dog is of spring metal and is mounted to swing on a pin 6, attached to the standard 2. Also pivotally connected to the side of the standard is a cam-lever 7, having a cam-shaped head 8, which when in one position will hold the dog 5 in close connection with the rack-bar. When turned to another position—that is, to bring the surface of the head 8 a less distance from the axis—the dog 5 will swing outward free from the rack, so that the box or body may be lifted. Of course there will be one of these holding devices at each side of the wagon-box and preferably over the rear bolster.

By this device it is obvious that the box will be held from all jumping motion relatively to the bolster, and as the top of the bolster wears away or the bottom of the box wears the spring-yielding dog will permit the box to move downward, so that the box can engage with another tooth of the rack-bar.

It is obvious that this device may be readily attached to any wagon of the construction shown without weakening any of the parts.

Having thus fully described my invention, I claim as new and desire to secure by Letters Patent—

1. A wagon-box holder, comprising a rack-bar adapted to be secured to the side of the box, a dog mounted to swing on the wagon-standard and adapted for engagement with the teeth of the rack-bar, and a lever pivoted to the standard and having a cam-head engaging with the dog, substantially as specified.

2. A wagon-box holder, comprising a rack-bar secured to the wagon-box, a spring-yielding dog mounted to swing on a standard of the wagon and adapted for engagement with a tooth of the rack-bar, and a cam-lever for holding the dog in engagement with the rack-bar, substantially as specified.

3. A wagon-box holder, comprising a rack-bar attached to the wagon-box, and a part supported on a standard of the wagon and adapted for engagement with said rack-bar, substantially as specified.

WILLIAM A. CROTTS.

Witnesses:
   ADA CROTTS,
   R. J. GRESHAM.